June 25, 1929.   W. H. PAULL   1,718,874
RIM FOR PNEUMATIC TIRES
Filed July 14, 1927
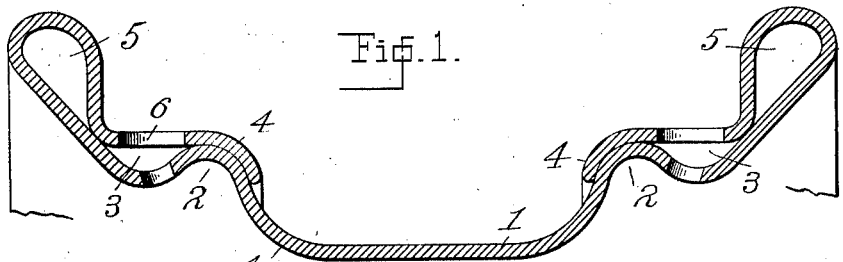
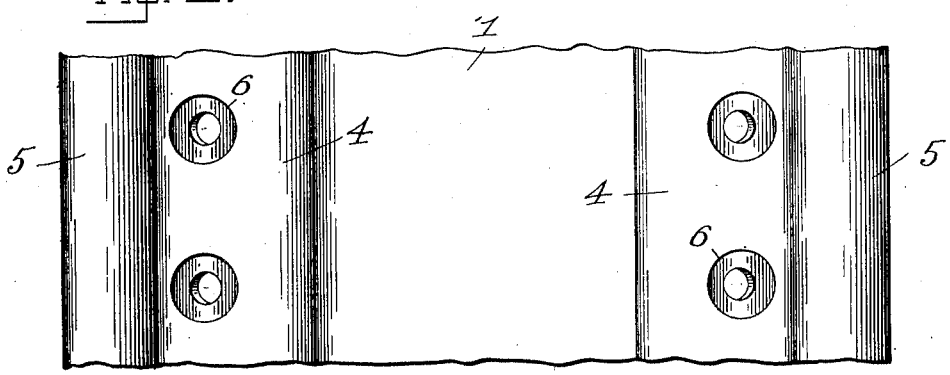
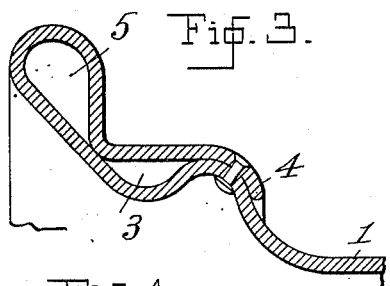
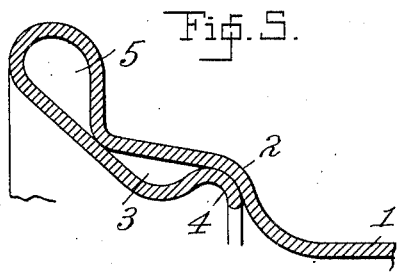
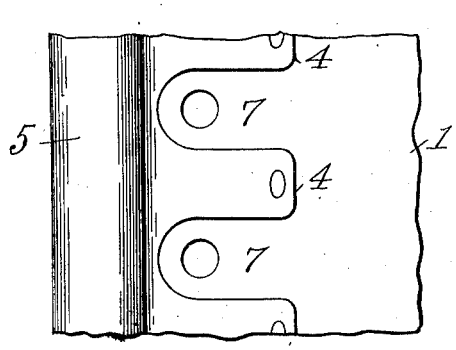
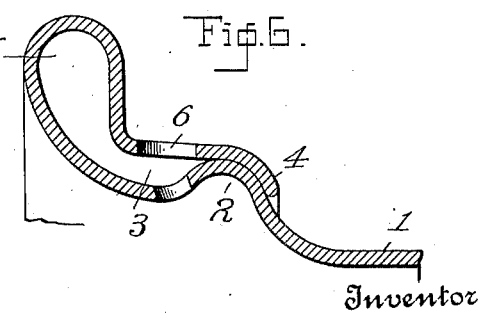
Inventor
Wallace Henry Paull
By his Attorney Patented June 25, 1929.

1,718,874

UNITED STATES PATENT OFFICE.

WALLACE HENRY PAULL, OF FORT DUNLOP, BIRMINGHAM, ENGLAND, ASSIGNOR TO DUNLOP RUBBER COMPANY LIMITED, OF FORT DUNLOP, BIRMINGHAM, ENGLAND, A CORPORATION OF GREAT BRITAIN.

RIM FOR PNEUMATIC TIRES.

Application filed July 14, 1927, Serial No. 205,726, and in Great Britain September 2, 1926.

This invention relates to improvements in rims for pneumatic tires of the kind having grooves adjacent the tire edges into which said grooves the heads of the spokes of the wheel of which the said rim is to form a part may be anchored.

In rims of this kind there is a certain tendency for the side flanges, which position the beads of the tire, occasionally to splay apart and it is the object of this present invention to reinforce the rim against such a tendency—a further object being the provision in such rims of an improved seating for the beads or inextensible edges of the tire.

According to this invention, therefore, I join the said side flanges to the central part of the rim across the aforesaid side grooves thereof by a spanning strip which may be wholly circumferential or not as desired.

In order that my invention may be more clearly understood and readily carried into effect the same will now be described with reference to the accompanying drawings in which—

Fig. 1 is a part sectional view of a rim according to said invention;

Fig. 2 is a part plan view of the same;

Fig. 3 is a sectional view of an alternative construction;

Fig. 4 is a partial plan thereof;

Figs. 5 and 6 are part sectional views showing modifications.

As shown in the drawings, the rim is of the well base type—particularly suited for "wired on" tires. Flanking the said well or circumferential depression 1 are shoulders 2 at the outward edge whereof are circumferential grooves 3 wherein the heads of the spokes of the wheel are adapted to be seated.

In the preferred embodiment of my invention as shown in Fig. 1, the spanning strip or tie is constituted by extensions 4 of the rim side flanges 5. The said extensions completely bridge the spoke grooves 3 and embrace or partly embrace the shoulders 2 to which said shoulders they are preferably attached by welding or riveting or in any other convenient manner.

To permit of the carrying out of the spoking operations the spanning strip may be perforated as shown at 6 in Figs. 1 and 2, or otherwise apertured—with recesses 7 as shown in Figs. 3 and 4.

From the foregoing it will be apparent that the spanning strip at once obviates the possibility of distortion of the rim under strain and also provides a particularly convenient seating for the tire edges.

It is not to be construed that I am limited to the described way of forming the said spanned groove.

For instance, it will be apparent that as shown in Fig. 5 the edges of the strip from which the rim is formed may be turned outwardly—rather than inwardly as before indicated. Further as exemplified in Fig. 6, it should be understood that the spanning strip need not completely bridge the said grooves 3. Again, the said strip is not essentially integral with the rim and neither is it necessarily completely circumferential as for instance it may be constituted by a series of spans attached both to the rim flanges and the central part of the rim. And finally it should be understood that the central part is not necessarily formed into a circumferential well as herein said—it may be formed in any other convenient manner as desired.

Various modifications of the invention may be made by those skilled in the art without departing from the invention as defined in the following claims.

What I claim is:—

1. A rim comprising a metal strip bent to provide a central well portion, the side walls of which are bent outwardly and downwardly thence upwardly and outwardly to provide side channel portions, the edges of said strip being bent inwardly and downwardly to provide tire carrying channels and terminating in contact with the upper edges of the well portion.

2. A rim comprising a metal strip shaped to a cross sectional contour to provide a central well portion the side walls of which extend outwardly and downwardly then upwardly and outwardly forming annular channel portions adjacent said well portion, the edges of the strip then extending upwardly and outwardly and being bent inwardly and downwardly, thence extending laterally inwardly and bridging said annular channel portions and terminating in engagement with the edges of the well portion.

In witness whereof, I have hereunto signed my name.

WALLACE HENRY PAULL.